(12) United States Patent
Thompson et al.

(10) Patent No.: US 9,845,635 B2
(45) Date of Patent: *Dec. 19, 2017

(54) WINDOW FRAME SYSTEM FOR VACUUM INSULATED GLASS UNIT

(71) Applicant: Guardian Glass, LLC, Auburn Hills, MI (US)

(72) Inventors: Robert D. Thompson, Perrysburg, OH (US); Charles L. Anderson, Mineral Wells, WV (US); John M. Mitchell, Gainesville, GA (US); Nigel J. Flynn, Flowery Branch, GA (US); Kunal D. MacDonald, Atlanta, GA (US); David Scott Rowley, Powder Springs, GA (US); Edward I. Stamm, Jr., Roswell, GA (US)

(73) Assignee: Guardian Glass, LLC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/268,744

(22) Filed: Sep. 19, 2016

(65) Prior Publication Data

US 2017/0002599 A1  Jan. 5, 2017

Related U.S. Application Data

(63) Continuation-in-part of application No. 14/717,318, filed on May 20, 2015, now Pat. No. 9,447,627.
(Continued)

(51) Int. Cl.
*E06B 3/677* (2006.01)
*E06B 3/02* (2006.01)
(Continued)

(52) U.S. Cl.
CPC .............. *E06B 3/025* (2013.01); *E06B 3/221* (2013.01); *E06B 3/24* (2013.01); *E06B 3/263* (2013.01);
(Continued)

(58) Field of Classification Search
CPC . E06B 3/24; E06B 3/5481; E06B 3/66; E06B 3/677; E06B 3/67; E06B 3/6612;
(Continued)

(56) References Cited

U.S. PATENT DOCUMENTS 1,982,351 A   11/1934  Phillips
2,887,737 A    5/1959  Prescott
(Continued)

FOREIGN PATENT DOCUMENTS

AT         509902 B1    4/2012
AU    2013100163 A4    3/2013
(Continued)

OTHER PUBLICATIONS

International Search Report in corresponding PCT Application No. PCT/US2015/032532 mailed Aug. 25, 2015 with English translation.
(Continued)

*Primary Examiner* — Adriana Figueroa
*Assistant Examiner* — Jessie Fonseca
(74) *Attorney, Agent, or Firm* — Harness, Dickey & Pierce, P.L.C.

(57) ABSTRACT

A window assembly may include a vacuum insulated glass unit and a frame assembly. The vacuum insulated glass unit may include first and second glass substrates defining a space therebetween that is at a pressure lower than atmospheric pressure. One of the first and second glass substrates may include a vacuum port extending outward therefrom. The vacuum port may define a passage in communication
(Continued)

with the space. The frame assembly supports the glass unit and may include a base member and a glazing member. The base member and the glazing member cooperate to define a slot in which an edge portion of the glass unit is received. The glazing member may include a cavity receiving the vacuum port.

48 Claims, 7 Drawing Sheets

Related U.S. Application Data

(60) Provisional application No. 62/003,158, filed on May 27, 2014.

(51) Int. Cl.

| | |
|---|---|
| *E06B 3/66* | (2006.01) |
| *E06B 7/14* | (2006.01) |
| *E06B 3/263* | (2006.01) |
| *E06B 3/54* | (2006.01) |
| *E06B 3/22* | (2006.01) |
| *E06B 3/24* | (2006.01) |

(52) U.S. Cl.
CPC .......... *E06B 3/5454* (2013.01); *E06B 3/6612* (2013.01); *E06B 3/677* (2013.01); *E06B 7/14* (2013.01); *E06B 2003/26321* (2013.01); *E06B 2003/5472* (2013.01); *Y02B 80/24* (2013.01)

(58) Field of Classification Search
CPC ........ E06B 3/221; E06B 3/5454; E06B 3/025; E06B 3/549; E06B 3/6775; Y02B 80/24
See application file for complete search history.

(56) References Cited

U.S. PATENT DOCUMENTS

| | | | |
|---|---|---|---|
| 4,492,063 A | 1/1985 | Schock et al. | |
| 4,740,405 A | 4/1988 | Tanaka et al. | |
| 5,105,596 A | 4/1992 | Wertitsch et al. | |
| 5,596,151 A | 1/1997 | Rossini | |
| 5,649,389 A | 7/1997 | Coddens | |
| 5,664,395 A | 9/1997 | Collins et al. | |
| 6,105,319 A | 8/2000 | Brunt | |
| 6,105,336 A * | 8/2000 | Katoh .................. | E06B 3/66 428/34 |
| 6,365,242 B1 | 4/2002 | Veerasamy | |
| 6,383,580 B1 | 5/2002 | Aggas | |
| 6,408,578 B1 | 6/2002 | Tanaka et al. | |
| 6,553,728 B1 | 4/2003 | Zurn | |
| 6,676,786 B1 | 1/2004 | Collins et al. | |
| 6,735,922 B2 | 5/2004 | Paffen | |
| 7,281,561 B2 | 10/2007 | Anderson et al. | |
| 7,845,142 B2 | 12/2010 | Theios | |
| 8,112,860 B2 | 2/2012 | Collins | |
| 8,377,524 B2 | 2/2013 | Theios et al. | |
| 2002/0184839 A1 | 12/2002 | Emek | |
| 2003/0037493 A1 | 2/2003 | Guhl et al. | |
| 2003/0126812 A1 | 7/2003 | Folsom et al. | |
| 2003/0198780 A1 | 10/2003 | Campese et al. | |
| 2005/0034386 A1 | 2/2005 | Crandell et al. | |
| 2005/0132558 A1 | 6/2005 | Hennessy et al. | |
| 2006/0101734 A1 | 5/2006 | Fischer et al. | |
| 2007/0033887 A1 | 2/2007 | Ambrose | |
| 2007/0148379 A1 | 6/2007 | Theios et al. | |
| 2009/0155500 A1 | 6/2009 | Cooper et al. | |
| 2010/0160084 A1 | 6/2010 | Sullivan et al. | |
| 2011/0265408 A1 | 11/2011 | Jha et al. | |
| 2011/0283625 A1 | 11/2011 | Lenox et al. | |
| 2011/0315270 A1 | 12/2011 | McHugh | |
| 2012/0255245 A1 | 10/2012 | Stone | |
| 2012/0304591 A1 | 12/2012 | Cooper | |
| 2013/0074445 A1 | 3/2013 | Jones | |
| 2013/0129944 A1 | 5/2013 | Theios et al. | |
| 2014/0007396 A1 | 1/2014 | Jones | |
| 2014/0072735 A1 | 3/2014 | Jones | |
| 2014/0186556 A1 | 7/2014 | Dear | |

FOREIGN PATENT DOCUMENTS

| | | |
|---|---|---|
| BE | 1018344 A3 | 9/2010 |
| CN | 101307147 A | 11/2008 |
| CN | 201204102 Y | 3/2009 |
| CN | 101718134 A | 6/2010 |
| CN | 201723069 U | 1/2011 |
| CN | 102400631 A | 4/2012 |
| CN | 102606030 A | 7/2012 |
| CN | 102877757 A | 1/2013 |
| CN | 102900315 A | 1/2013 |
| CN | 202645306 U | 1/2013 |
| DE | 4331816 A1 | 3/1995 |
| DE | 19728792 A1 | 1/1999 |
| DE | 202006004515 U1 | 8/2007 |
| DE | 102010009098 A1 | 8/2011 |
| DE | 102010010831 A1 | 9/2011 |
| DE | 102010054006 A1 | 6/2012 |
| DE | 102011015455 A1 | 10/2012 |
| DE | 102011018746 A1 | 10/2012 |
| DE | 102011106259 A1 | 11/2012 |
| DE | 202012103889 U1 | 11/2012 |
| DE | 202013100102 U1 | 2/2013 |
| EP | 0902148 A2 | 3/1999 |
| EP | 1333222 B1 | 10/2005 |
| EP | 1760244 A1 | 3/2007 |
| EP | 1974116 A1 | 10/2008 |
| EP | 2233674 A1 | 9/2010 |
| EP | 2327855 A2 | 6/2011 |
| FR | 2891575 A1 | 4/2007 |
| FR | 2974323 A1 | 10/2012 |
| GB | 2282627 A | 4/1995 |
| GB | 2373013 B | 11/2004 |
| GB | 2402697 A | 12/2004 |
| JP | 2002-021436 A | 1/2002 |
| JP | 04814161 B2 | 11/2011 |
| JP | 2012229617 A | 11/2012 |
| NZ | 583779 A | 9/2011 |
| WO | WO-0071849 A1 | 11/2000 |
| WO | WO-2010058163 A1 | 5/2010 |
| WO | WO-2012019988 A1 | 2/2012 |
| WO | WO-2012130377 A1 | 10/2012 |

OTHER PUBLICATIONS

Simko et al. "Edge Conduction in Vacuum Glazing" Thermal Envelopes VI/Heat Transter in Fenestration II-Principles, pp. 601-611, 1995.

U.S. Office Action regarding U.S. Appl. No. 14/717,318, dated Jul. 31, 2015.

U.S. Office Action regarding U.S. Appl. No. 14/717,318, dated Feb. 12, 2016.

Notice of Allowance issued in U.S. Appl. No. 14/717,318, dated May 25, 2016.

EPO Extended Search Report dated Oct 26, 2017.

* cited by examiner

WINDOW FRAME SYSTEM FOR VACUUM INSULATED GLASS UNIT

CROSS-REFERENCE TO RELATED APPLICATIONS

This application is a continuation-in-part of U.S. patent application Ser. No. 14/717,318 filed on May 20, 2015, which claims the benefit of U.S. Provisional Application No. 62/003,158 filed on May 27, 2014. The entire disclosure of each of the above applications is incorporated herein by reference.

FIELD

The present disclosure relates to a window frame system, and more particularly, to a window frame system for a vacuum insulated glass unit.

BACKGROUND

This section provides background information related to the present disclosure and is not necessarily prior art.

Advancements in glass technology continue to increase the insulation values of windows for buildings or homes, for example. Such advancements continue to reduce the amount of heat transfer through the glass units. These high-performing glass units, however, create new problems for the existing window frame and/or glazing technologies. In order for the window assembly, as a whole, to perform at a high level, there is a need for these high-performing glass units to be installed in high-performance window frame systems. Installing high-performing glass units in high-performing window frame systems can yield the synergetic effect of drastically increasing the R-value (thermal resistance) of the window assembly, as a whole, and drastically improving the energy efficiency of the building or home.

SUMMARY

This section provides a general summary of the disclosure, and is not a comprehensive disclosure of its full scope or all of its features.

A window assembly may include a vacuum insulated glass unit and a frame assembly. The vacuum insulated glass unit may include first and second glass substrates defining a space therebetween that is at a pressure lower than atmospheric pressure. One of the first and second glass substrates may include a vacuum port extending outward therefrom. The vacuum port may define a passage in communication with the space. The frame assembly supports the glass unit and may include a base member and a glazing member. The base member and the glazing member cooperate to define a slot in which an edge portion of the glass unit is received. One of the base member or the glazing member may include a cavity receiving the vacuum port. The glazing member and the base member may define a plurality of pockets that reduce or hinder thermal conductivity through the frame assembly.

In some embodiments, the glazing member includes a tab that snaps into engagement with the base member.

In some embodiments, the base member includes embedded reinforcement members.

In some embodiments, at least one of the base member and the glazing member include embedded additives that reduce thermal conductivity thereof.

In some embodiments, the base member includes a recess adjacent the slot that receives a portion of the glass unit when the glass unit is in a distorted condition.

In some embodiments, the recess includes an insulative barrier received therein to absorb energy associated with distortion of the glass unit.

In some embodiments, the glazing member structurally supports the glass unit.

In some embodiments, the glazing member bears at least a portion of a load of the glass unit.

In some embodiments, the glazing member and the base member cooperate to bear the load of the glass unit.

In some embodiments, the cavity that receives the vacuum port is filled with an insulative material.

In some embodiments, at least one of the pockets is filled with air.

In some embodiments, at least one of the pockets is filled with foam.

In some embodiments, the edge portion of the glass unit is inserted into the slot to a bite depth of at least 1.25 inches.

In another form, the present disclosure provides a window assembly that includes a vacuum insulated glass unit and a frame assembly. The glass unit may include first and second glass substrates defining a space therebetween that is at a pressure lower than atmospheric pressure. The frame assembly may support the glass unit and may include a base member and a glazing member. The base member and the glazing member may cooperate to define a slot in which an edge portion of the glass unit is received. One of the base member or the glazing member may include a recess adjacent the slot that receives a portion of the glass unit when the glass unit is in a distorted condition.

In some embodiments, one of the first and second glass substrates may include a vacuum port extending outward therefrom, the vacuum port defining a passage in communication with the space, and one of the base member or the glazing member includes a cavity receiving the vacuum port.

In some embodiments, the cavity that receives the vacuum port is filled with an insulative material.

In some embodiments, the glazing member and the base member define a plurality of pockets that reduce thermal conductivity through the frame assembly.

In some embodiments, at least one of the pockets is filled with air.

In some embodiments, at least one of the pockets is filled with foam.

In some embodiments, the glazing member includes a tab that snaps into engagement with the base member.

In some embodiments, the base member includes embedded reinforcement members.

In some embodiments, at least one of the base member and the glazing member include embedded additives that reduce thermal conductivity thereof.

In some embodiments, the recess includes an insulative barrier received therein to absorb energy associated with distortion of the glass unit.

In some embodiments, the glazing member structurally supports the glass unit.

In some embodiments, the edge portion of the glass unit is inserted into the slot to a bite depth of greater than or equal to 1.25 inches.

In some embodiments, the glazing member bears at least a portion of a load of the glass unit.

In some embodiments, the glazing member and the base member cooperate to bear the load of the glass unit.

In another form, the present disclosure provides a window assembly that may include a plurality of vacuum insulated glass units and a frame assembly. Each of the vacuum insulated glass units may include first and second glass substrates defining a space therebetween that is at a pressure lower than atmospheric pressure, one of the first and second glass substrates including a vacuum port extending outward therefrom, the vacuum port defining a passage extending through one of the first and second glass substrates and in communication with the space. The frame assembly may support the vacuum insulated glass units and may include a base member and a glazing member. The base member and the glazing member may cooperate to define a first slot in which a portion of a first one of the vacuum insulated glass units is received. One of the base member or the glazing member may include a cavity receiving the vacuum port of the first one of the vacuum insulated glass units. The base member may define a second slot receiving a portion of a second one of the vacuum insulated glass units.

In another form, the present disclosure provides a window assembly that may include a vacuum insulated glass unit, a third glass substrate, and a frame assembly. The vacuum insulated glass unit may include first and second glass substrates defining a space therebetween that is at a pressure lower than atmospheric pressure. One of the first and second glass substrates may include a vacuum port extending outward therefrom. The vacuum port may define a passage extending through one of the first and second glass substrates and in communication with the space. The frame assembly may support the vacuum insulated glass unit and the third glass substrate and may include a base member and a glazing member. The base member and the glazing member may cooperate to define a first slot in which a portion of the vacuum insulated glass unit is received. One of the base member or the glazing member may include a cavity receiving the vacuum port of the vacuum insulated glass unit. The base member may define a second slot receiving a portion of the third glass substrate.

In another form, the present disclosure provides a window assembly that may include a plurality of vacuum insulated glass units and a frame assembly. Each of the vacuum insulated glass units may include first and second glass substrates defining a space therebetween that is at a pressure lower than atmospheric pressure. The frame assembly may support the vacuum insulated glass units and may include a base member and a glazing member. The base member and the glazing member may cooperate to define a first slot in which a portion of a first one of the vacuum insulated glass units is received. The base member may define a second slot receiving a portion of a second one of the vacuum insulated glass units. One of the base member or the glazing member may include a recess adjacent the first slot that receives a portion of the first one of the vacuum insulated glass units when the first one of the vacuum insulated glass units is in a distorted condition.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
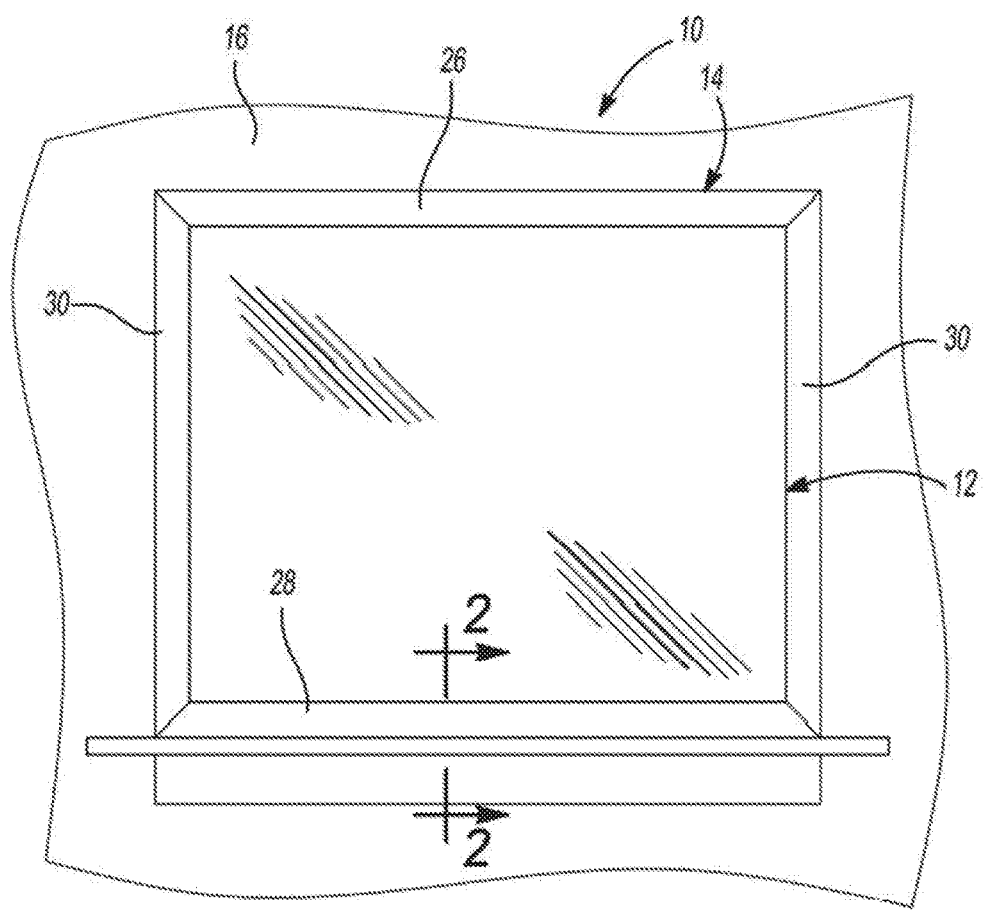
FIG. 1 is a schematic representation of a window assembly according to the principles of the present disclosure.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
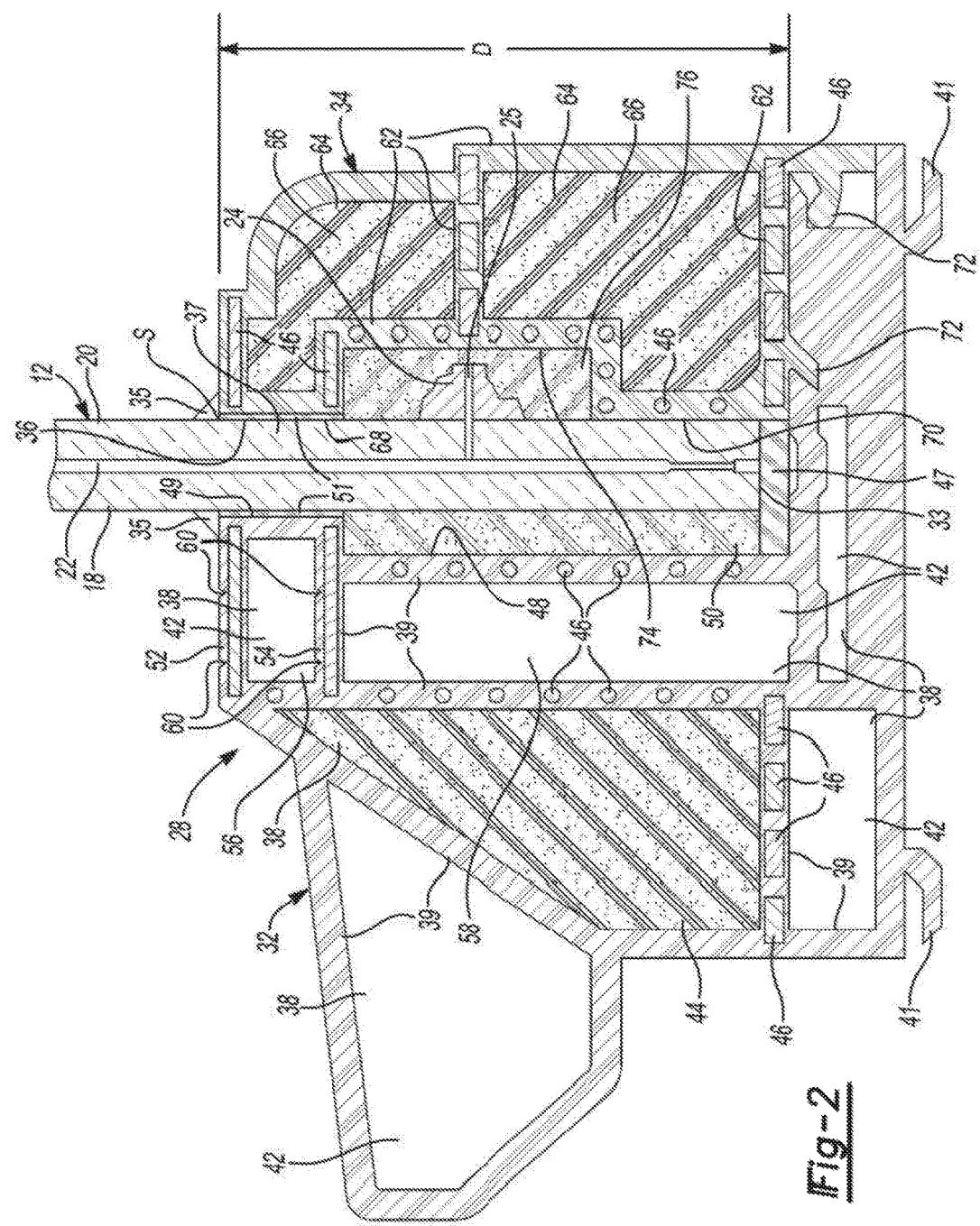
FIG. 2 is a cross-sectional view of a glass unit installed in a window frame system of the window assembly of FIG. 1.
Figure 3:
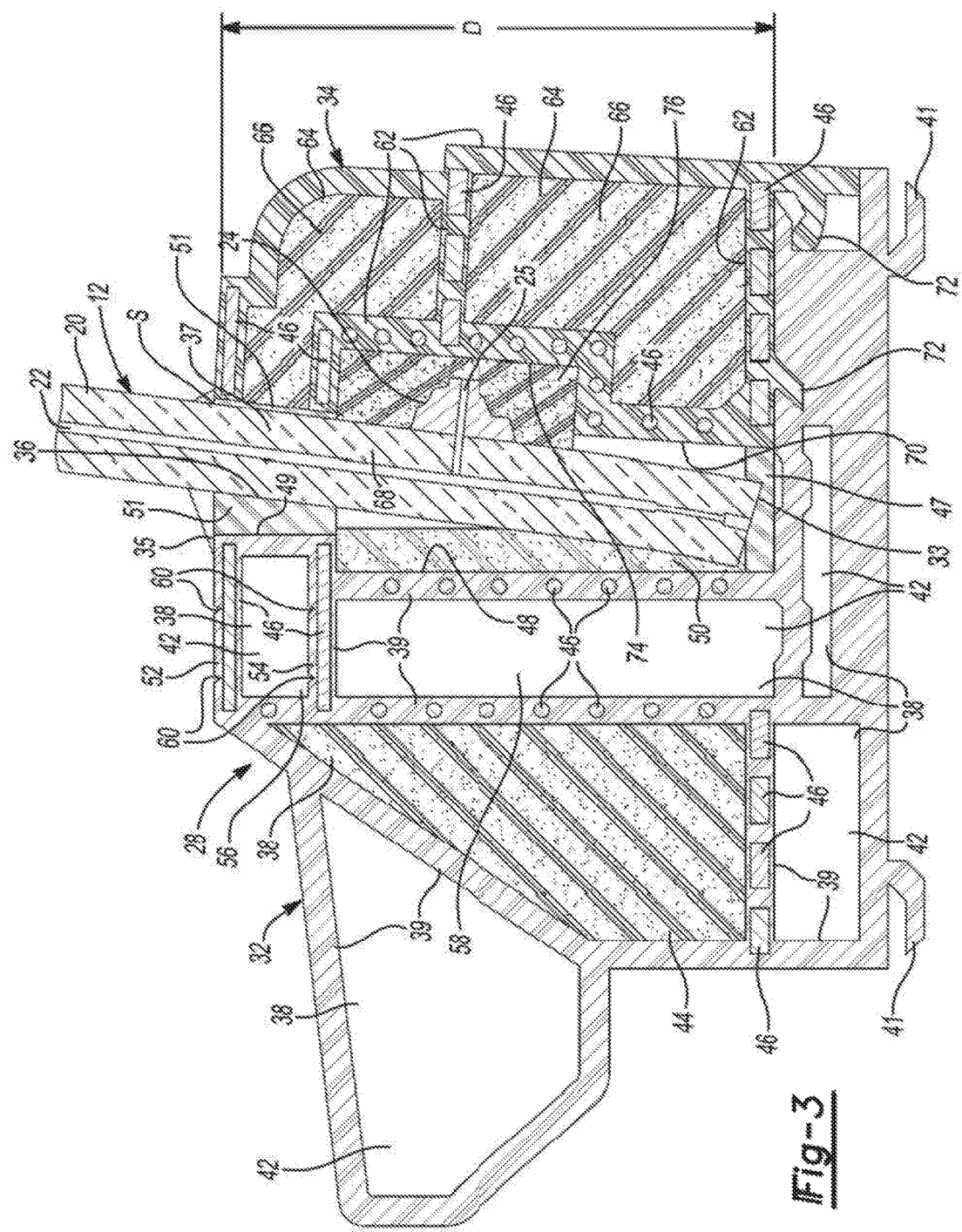
FIG. 3 is a cross-sectional view of the glass unit and window frame system of FIG. 2 in a distorted condition.

With reference to FIGS. 1-3, an exemplary window assembly 10 is provided that includes an insulated glass unit and in particular a vacuum insulated glass (VIG) unit 12 and a frame assembly 14. The window assembly 10 can be installed in a wall 16 (FIG. 1) of a building or home, for example. As shown in FIG. 2, the VIG unit 12 may include first and second glass substrates 18, 20 that cooperate to define a space 22 therebetween. The space 22 may be at a pressure that is less than atmospheric pressure. The second glass substrate 20 is the interior substrate (i.e., the substrate that is exposed to the interior of the building or home) and includes a vacuum port or tube 24 (shown schematically in FIGS. 2 and 3) defining a passage 25 that is in communication with the space 22. Gas within the space 22 can be evacuated through the vacuum port 24 prior to or after installation of the VIG unit 12 in the frame assembly 14.

As shown in FIG. 1, the frame assembly 14 may include a head portion 26, a sill portion 28 and a pair of jamb portions 30. The head, sill and jamb portions 26, 28, 30 may cooperate to support the VIG unit 12. The head, sill and jamb portions 26, 28, 30 may be wood, vinyl, aluminum or any suitable structural material having a desirable thermal conductivity. The head, sill and jamb portions 26, 28, 30 may include certain additives that lower thermal conductivity. For example, when vinyl is chosen as the material, the material can include embedded microspheres. Embedded microspheres may include, for example, expanding microspheres. The head, sill and jamb portions 26, 28, 30 may be generally similar or identical, and therefore, only the sill portion 28 will be described in detail below.

As shown in FIG. 2, the sill portion 28 may include a base member 32 and a glazing member 34. The glazing member 34 may be disposed on the interior side of the VIG unit 12 (i.e., the glazing member 34 may be disposed in the interior of the building or home) and may engage the base member 32 to define a slot 36 therebetween that receives some or all of an edge portion 37 of the VIG unit 12. The edge portion 37 is defined as extending approximately 2.5 inches from a distal edge 33 of the VIG unit 12. In some embodiments, a gasket 35 may be provided between the VIG unit 12 and the base member 32 and/or between the VIG unit 12 and the glazing member 34 to restrict or prevent fluid from entering the slot 36.

In some configurations, the edge portion 37 of the VIG unit 12 may extend into the slot 36 to a bite depth D of greater than or equal to 1.25 inches. In some variations, the bite depth D could be between about 0.75 and 5 inches or between about 0.75 and 3 inches, for example. The VIG unit 12 tends to have higher thermal conductivity at the distal edge 33 due to the edge seal between the first and second glass substrates 18, 20 at the distal edge 33. Therefore, the large bite depth lengthens the path that thermal energy (heat or cold) must travel to conduct between interior and exterior sides of the VIG unit 12, thereby improving the thermal performance of the window assembly 10.

The surface temperatures of the first and second glass substrates 18, 20 remain relatively constant from the center of the glass substrates 18, 20 until reaching the edge portion 37, i.e., approximately 2.5 inches from the distal edge 33, whereat the surface temperatures transition along a steep temperature gradient to the distal edge 33, which is unique to high performing VIG units. The surface temperature of the first glass substrate 18 transitions towards the surface temperature of the second glass substrate 20 while the surface temperature of the second glass substrate 20 transitions towards the surface temperature of the first glass substrate 18. The large bite depth prevents the accumulation of condensation on the second glass substrate 20 by affecting the surface temperature of the second glass substrate 20 that is exposed to the environmental conditions (e.g., relative humidity) of the interior of the building or home. Where the VIG unit 12 meets the frame assembly 14 defines a sight line S. The bite depth D is selected such that the surface temperature of the second glass substrate 20 at the sight line S will be above a target temperature throughout a range of interior and exterior environmental conditions in order to prevent condensation.

The distal edge 33 of the VIG unit 12 is seated on one or more glazing blocks 47 at the bottom of the slot 36. The glazing blocks 47 may comprise a rubber or similar polymer material and are used to support the VIG unit 12 during assembly of the window assembly 10. There may be a plurality of glazing blocks 47 spaced apart along the bottom of the slot 36. The glazing blocks 47 may be spaced apart to allow moisture that enters the slot 36 to drain out through weeping holes (not shown) in the bottom of the slot 36.

The base member 32 may be extruded, pultruded or injection molded from a polymeric or composite material, for example, and may include a plurality of support members or ribs 39 that cooperate to form one or more pockets 38. The pockets 38 may serve to reduce or hinder thermal conductivity through the base member 32. A lower end of the base member 32 may include one or more tabs 41 that engage the wall 16 of the building or home. One or more of the pockets 38 may be filled with air 42 and/or other gasses and one or more of the pockets 38 may be filled with an insulation material 44 to reduce the thermal conductivity of the frame assembly 14. The insulation material 44 can include foam, rubber, glass microspheres, perlite, aerogel, fused silica, and/or inert-gas-filled foam, for example. It will be appreciated that in some variations, all of the pockets 38 could be filled with air and/or other gases, or all of the pockets 38 could be filled with the insulation material 44. Any combination of such insulating gases or materials may be employed in the same or different pockets 38. In some embodiments, one or more of the ribs 39 may include reinforcement members 46 to provide additional rigidity and strength to the frame assembly 14 to reinforce the frame assembly 14 against forces caused by distortion of the VIG unit 12, for example. The reinforcement members 46 can be formed from any suitable material and can be embedded, co-extruded, co-pultruded or incorporated into the frame assembly 14 in any suitable manner. The reinforcement members 46 may have any suitable cross-section such as circular, rectangular, or square. In addition, there may be one or more reinforcement members 46 in each of the ribs 39. A first lateral surface 49 of the base member 32 may contact the first glass substrate 18 and cooperates with the glazing member 34 to securely retain the VIG unit 12 in the frame assembly 14. In some configurations, a two-sided adhesive glazing tape 51 or silicone or silicone-like product is disposed between the first lateral surface 49 and the first glass substrate 18.

In some embodiments, the base member 32 may include a recess 48 adjacent the slot 36. As shown in FIG. 3, the recess 48 is designed to accommodate distortion of the VIG unit 12 rather than constraining the VIG unit 12 at the distal edge 33. Constraining at the distal edge 33 may introduce significant additional stresses into the VIG unit 12. The base member 32 and the glazing member 34 may be designed to constrain the VIG unit 12 adjacent the sight line S, thereby preventing or minimizing distortion of the VIG unit 12. Constraining the VIG unit 12 adjacent the sight line S introduces less stress into the VIG unit 12 than would be introduced if the VIG unit 12 is constrained at the distal edge 33. In addition, the glazing member 34 may be designed to flex or pivot towards the interior of the building or home in response to distortion of the VIG unit 12. A primary cause of distortion of the VIG unit 12 is differences in thermal expansion and contraction as a result of exposure to large differences between outdoor and indoor temperatures which due to the rigid edge seal of the VIG unit 12 causes the first and second glass substrates 18, 20 to distort together in the same direction. Such thermal distortion of the first and second substrates 18, 20 together tends to be an issue that arises for VIG units, but not for conventional IG or other window units. Thus, the ability for the edge portion 37 of the VIG unit 12 to experience thermal distortion into the recess 48 prevents potential mechanical stress or failure of the VIG unit 12 or frame assembly 14 over long-term use. Distortion of the VIG unit 12 may also be caused by wind loads or the like. In some embodiments, a thermally insulative barrier 50 may be located in the recess 48. An adhesive may bond the insulative barrier 50 to the VIG unit 12 and/or to the base member 32. For example, the insulative barrier 50 could include silicone or a polystyrene tape. In some configurations, the insulative barrier 50 could be approximately five millimeters thick or thicker. The insulative barrier 50 may structurally adhere the base member 32 to the VIG unit 12 and absorb and displace energy associated with the distortion of the VIG unit 12. It will be appreciated that, in some embodiments, the recess 48 could be open (e.g., filled with gas or air rather than the insulative barrier 50).

Figure 6:
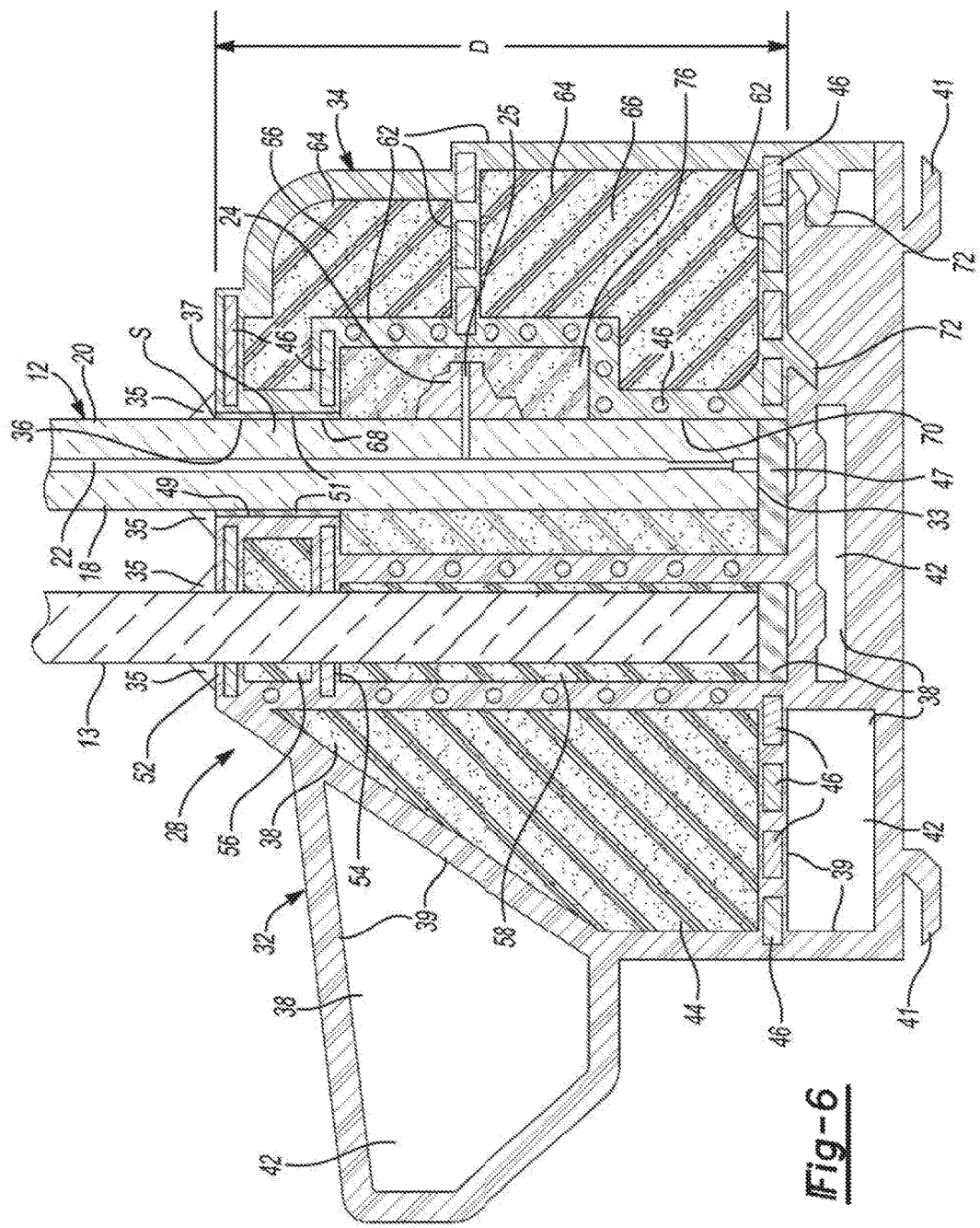
FIG. 6 is a cross-sectional view of the window frame system with of FIG. 2 with the glass unit and another glass substrate installed therein.
Figure 7:
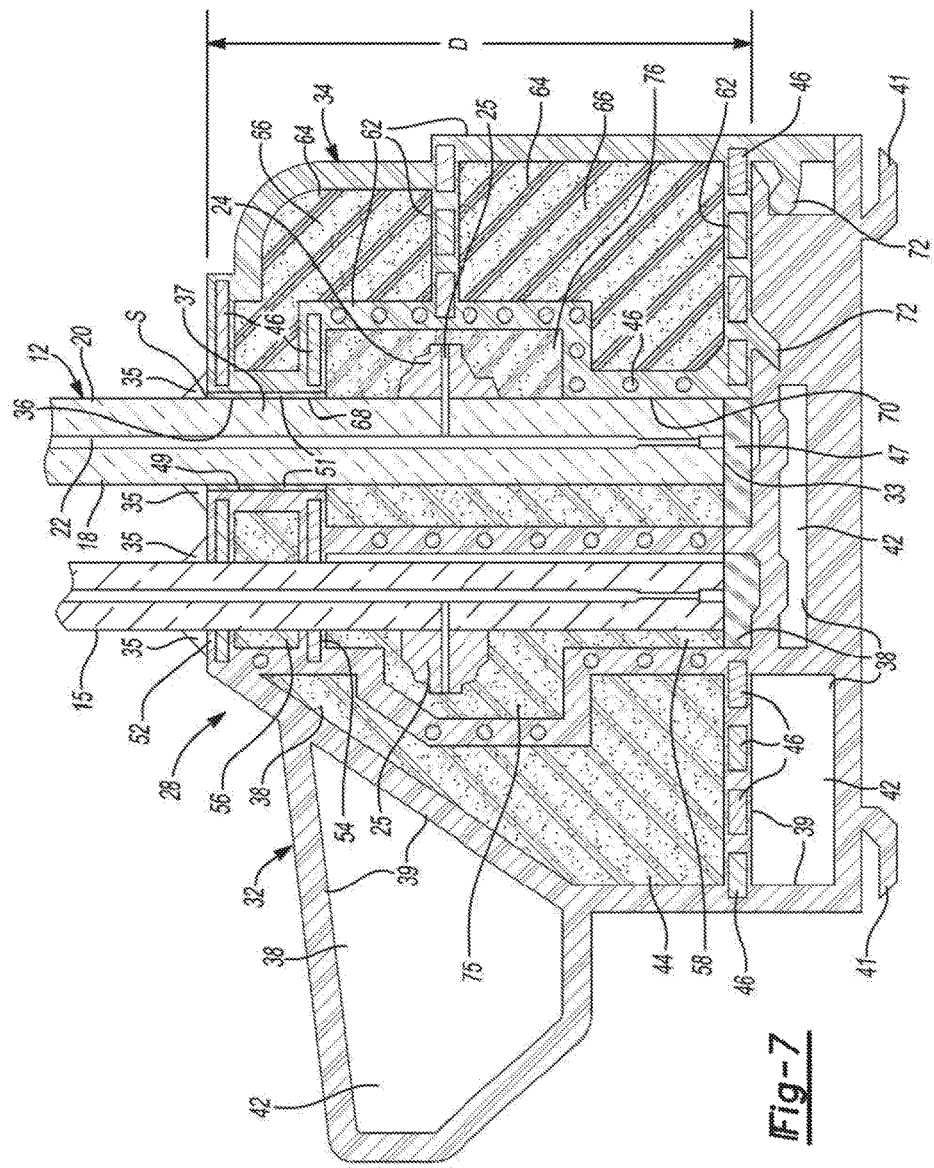
FIG. 7 is a cross-sectional view of the window frame system with of FIG. 2 with a plurality of glass units installed therein.

In some embodiments, one or more of the ribs 39 of the base member 32 may be trimmed or removed so that one or more of the pockets 38 may define another slot for receiving other glass substrate(s) or a second VIG unit. For example, in the configuration illustrated in FIG. 2, first and second ribs 52, 54 may be trimmed or removed so that first and second pockets 56, 58 can function as a slot for receiving another glass substrate 13 (as shown in FIG. 6) or a second VIG unit 15 (as shown in FIG. 7). One or both of the first and second ribs 52, 54 may include one or more notches 60 that facilitate the cutting or breaking of the first and second ribs 52, 54 to allow for the insertion of glass substrate 13 or the second VIG unit 15 as well as insulation material (e.g., foam, rubber, glass microspheres, perlite, aerogel, fused silica, and/or inert-gas-filled foam) to surround the glass substrate 13 or the second VIG unit 15.

The glazing member 34 may comprise a polymeric material or a polymeric composite comprising a reinforcement phase. The glazing member 34 may be formed via extruding, pultruding or injection molding such a polymeric or composite material, for example, and may include a plurality of support members or ribs 62 that cooperate to form pockets 64. One or more of the pockets 64 may be filled with air, other gases and/or insulation material 66 to reduce the thermal conductivity of the frame assembly 14. The insulation material 66 can include foam, rubber, glass microspheres, perlite, aerogel, fused silica, and/or inert-gas-filled foam, for example. In some embodiments, one or more of the ribs 62 may include reinforcement members 46 to provide additional rigidity and strength to the frame assembly 14. First and second lateral surfaces 68, 70 of the glazing member 34 may contact the second glass substrate 20 and cooperate with the base member 32 to securely retain the VIG unit 12 in the frame assembly 14. In some configurations, two-sided adhesive glazing tape 51 or silicone or silicone-like product is disposed between the first and/or second lateral surfaces 68, 70 and the second glass substrate 20.

A lower end of the glazing member 34 may include one or more resiliently flexible tabs 72 that snap into engagement with the base member 32. The tabs 72 may allow the glazing member 34 to pivot to accommodate distortion of the VIG unit 12 and/or provide for removal of the glazing member 34. In this manner, the glazing member 34 may be repeatedly snapped into and out of the window assembly 10 on demand, even after the window assembly 10 has been installed into the wall 16 of the building or home.

The glazing member 34 may also include a recess (or cavity) 74 formed between the first and second lateral surfaces 68, 70. The recess 74 may receive the vacuum port 24 of the VIG unit 12 and may protect the vacuum port 24 from being damaged. The recess 74 is designed to accommodate distortion of the VIG unit 12 without damaging the vacuum port 24, or more importantly, without causing the VIG unit 12 to lose its vacuum. The recess 74 may be filled with an insulative material 76 that surrounds the vacuum port 24. The insulative material 76 can include foam, rubber, glass microspheres, perlite, aerogel, fused silica, and/or inert-gas-filled foam, for example. The insulative material 76 may be compliant enough to allow for relative movement between the vacuum port 24 and the glazing member 34 without damaging the vacuum port 24, or more importantly, without causing the VIG unit 12 to lose its vacuum. In an alternative embodiment, the second lateral surface 70 of the glazing member 34 does not contact the second glass substrate 20. Rather, the recess 74 extends from the first lateral surface 68 to the bottom of the slot 36. As shown in FIG. 7, in some configurations, another recess or cavity 75 (similar to the recess 74) may be formed in the base member 32 that may receive a vacuum port 25 of the second VIG unit 15. While the figures show the VIG units 12, 15 having outwardly protruding vacuum ports 24, 25, in some configurations, the vacuum ports 24, 25 may be substantially flush to the surface of the glass substrate of the VIG unit 12, 15. In other configurations, the VIG units 12, 15 may not include the vacuum ports 24, 25 at all. Additionally or alternatively, either or both of the first and second glass substrates 18, 20 of either or both of the VIG units 12, 15 could be laminated substrates (e.g., substrates with laminated layers of glass with a layer of polyvinyl butyral (PVB) between the glass layers).

In some warmer climates (such as the southern United States), it is anticipated that the glazing member 34 may be disposed on the exterior side of the VIG unit 12 (i.e., the glazing member 34 may be disposed on the exterior of the building or home) to accommodate distortion of the VIG unit 12 in a direction opposite to what would be experienced in colder climates (such as the northern United States).

Figure 4:
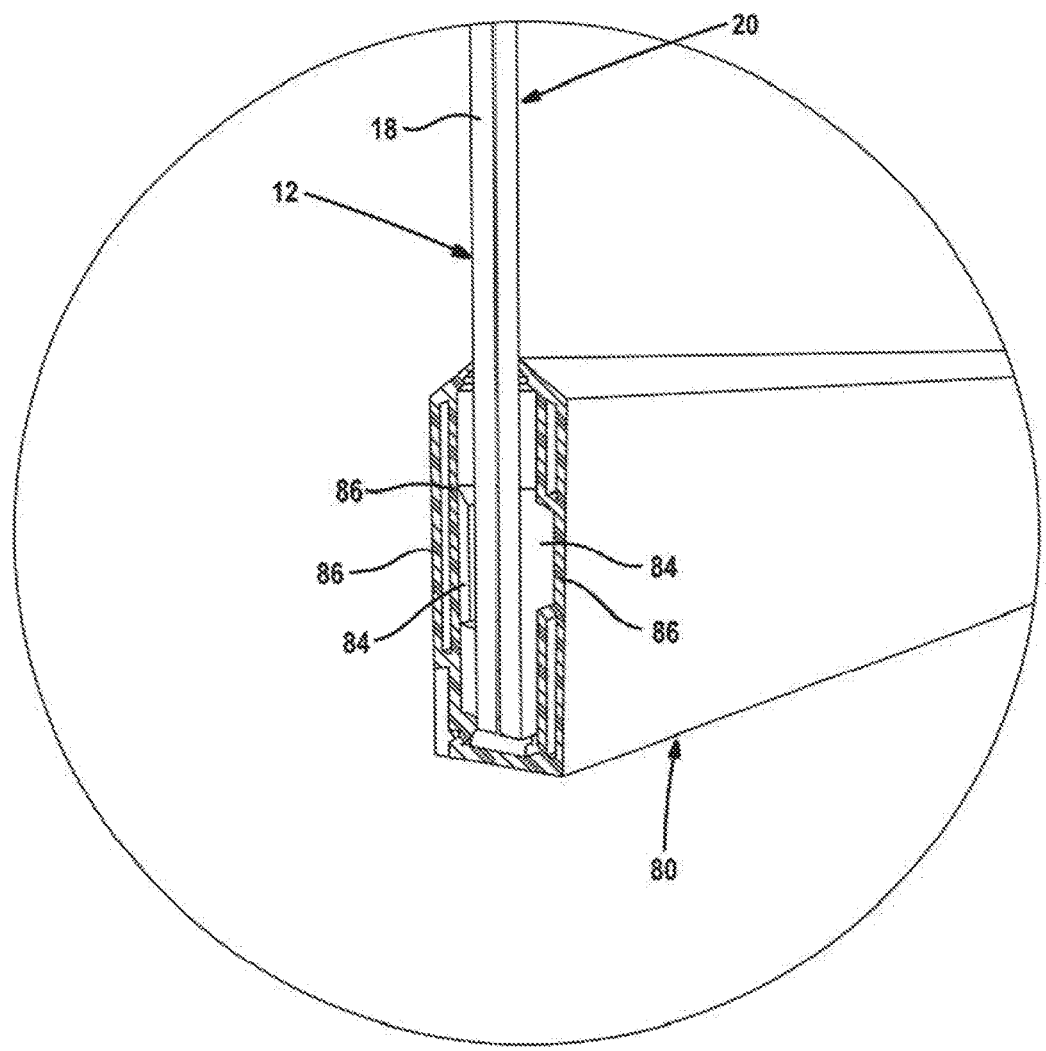
FIG. 4 is a perspective view of a glass unit and a coupler according to the principles of the present disclosure.
Figure 5:
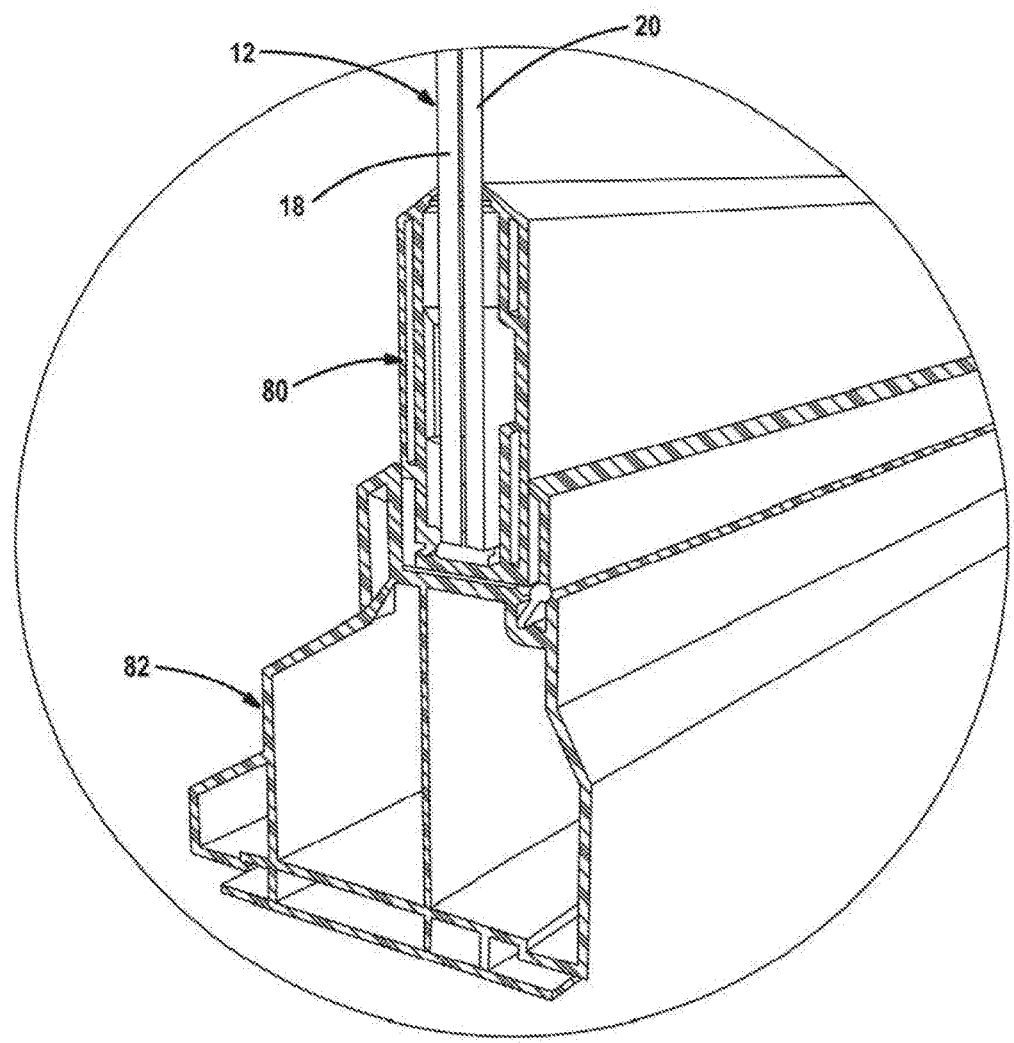
FIG. 5 is a perspective view of the glass unit and coupler installed in a frame assembly.

With reference to FIGS. 4 and 5, a coupler 80 is provided that may be used to adapt the VIG unit 12 to a standard window frame assembly 82. The coupler 80 may include features similar or identical to the frame assembly 14, such as the recess 48 and the recess 74 to accommodate distortion of the VIG unit 12. Like the frame assembly 14, the coupler 80 provides a large bite depth to hinder heat transfer between the first and second substrates 18, 20 and prevent the accumulation of condensation on the second glass substrate 20. As shown in FIG. 5, the coupler 80 may be received in or otherwise attached to the frame assembly 82. Like the frame assembly 14, walls of the coupler 80 may include reinforcement members, like reinforcement members 46 described above. Insulative gases or materials may fill one or more cavities 84 between ribs 86 of the coupler 80.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A window assembly comprising:
   a vacuum insulated glass unit including first and second glass substrates defining a space therebetween that is at a pressure lower than atmospheric pressure, one of the first and second glass substrates including a vacuum port, the vacuum port defining a passage extending through one of the first and second glass substrates in communication with the space; and
   a frame assembly supporting the vacuum insulated glass unit and including a base member and a glazing member, the base member and the glazing member cooperating to define a slot in which an edge portion of the vacuum insulated glass unit is received, wherein one of the base member or the glazing member includes a cavity receiving the vacuum port.

2. The window assembly of claim 1, wherein the glazing member includes a tab that snaps into engagement with the base member.

3. The window assembly of claim 1, wherein the base member includes embedded reinforcement members.

4. The window assembly of claim 1, wherein the glazing member structurally supports the vacuum insulated glass unit.

5. The window assembly of claim 1, wherein the cavity that receives the vacuum port is filled with an insulative material.

6. The window assembly of claim 1, wherein at least one of the base member and the glazing member comprises vinyl having embedded additives that reduce thermal conductivity thereof.

7. The window assembly of claim 1, wherein the edge portion of the vacuum insulated glass unit is inserted into the slot to a bite depth of greater than or equal to 1.25 inches.

8. The window assembly of claim 1, wherein the glazing member bears at least a portion of a load of the vacuum insulated glass unit.

9. The window assembly of claim 8, wherein the glazing member and the base member cooperate to bear the load of the vacuum insulated glass unit.

10. A window assembly comprising:
    a plurality of vacuum insulated glass units each including first and second glass substrates defining a space therebetween that is at a pressure lower than atmospheric pressure, one of the first and second glass substrates including a vacuum port extending outward therefrom, the vacuum port defining a passage extending through one of the first and second glass substrates and in communication with the space; and
    a frame assembly supporting the vacuum insulated glass units and including a base member and a glazing member, the base member and the glazing member cooperating to define a first slot in which a portion of a first one of the vacuum insulated glass units is received, one of the base member or the glazing member including a cavity receiving the vacuum port of the first one of the vacuum insulated glass units, the base member defining a second slot receiving a portion of a second one of the vacuum insulated glass units.

11. The window assembly of claim 10, wherein the glazing member includes a tab that snaps into engagement with the base member.

12. The window assembly of claim 10, wherein the base member includes embedded reinforcement members.

13. The window assembly of claim 10, wherein the glazing member and the base member defining a plurality of pockets that reduce thermal conductivity through the frame assembly.

14. The window assembly of claim 13, wherein at least one of the pockets is filled with air.

15. The window assembly of claim 13, wherein at least one of the pockets is filled with foam.

16. The window assembly of claim 13, wherein the base member includes a recess adjacent the first slot that receives a portion of the first one of the vacuum insulated glass units when the first one of the vacuum insulated glass units is in a distorted condition.

17. The window assembly of claim 16, wherein the recess includes an insulative barrier received therein to absorb energy associated with distortion of the first one of the vacuum insulated glass units.

18. The window assembly of claim 10, wherein the glazing member structurally supports the first one of the vacuum insulated glass units.

19. The window assembly of claim 10, wherein the cavity that receives the vacuum port of the first one of the vacuum insulated glass units is filled with an insulative material.

20. The window assembly of claim 10, wherein at least one of the base member and the glazing member comprises vinyl having embedded additives that reduce thermal conductivity thereof.

21. The window assembly of claim 10, wherein the portion of the first one of the vacuum insulated glass units is inserted into the first slot to a bite depth of greater than or equal to 1.25 inches.

22. The window assembly of claim 10, wherein the glazing member and the base member cooperate to bear a load of the first one of the vacuum insulated glass units.

23. A window assembly comprising:
a vacuum insulated glass unit including first and second glass substrates defining a space therebetween that is at a pressure lower than atmospheric pressure, one of the first and second glass substrates including a vacuum port extending outward therefrom, the vacuum port defining a passage extending through one of the first and second glass substrates and in communication with the space;
a third glass substrate; and
a frame assembly supporting the vacuum insulated glass unit and the third glass substrate and including a base member and a glazing member, the base member and the glazing member cooperating to define a first slot in which a portion of the vacuum insulated glass unit is received, one of the base member or the glazing member including a cavity receiving the vacuum port of the vacuum insulated glass unit, the base member defining a second slot receiving a portion of the third glass substrate.

24. The window assembly of claim 23, wherein the glazing member includes a tab that snaps into engagement with the base member.

25. The window assembly of claim 23, wherein the base member includes embedded reinforcement members.

26. The window assembly of claim 23, wherein the glazing member and the base member define a plurality of pockets that reduce thermal conductivity through the frame assembly.

27. The window assembly of claim 26, wherein at least one of the pockets is filled with air.

28. The window assembly of claim 26, wherein at least one of the pockets is filled with foam.

29. The window assembly of claim 26, wherein the base member includes a recess adjacent the first slot that receives a portion of the vacuum insulated glass unit when the vacuum insulated glass unit is in a distorted condition.

30. The window assembly of claim 29, wherein the recess includes an insulative barrier received therein to absorb energy associated with distortion of the vacuum insulated glass unit.

31. The window assembly of claim 23, wherein the glazing member structurally supports the vacuum insulated glass unit.

32. The window assembly of claim 23, wherein the cavity that receives the vacuum port is filled with an insulative material.

33. The window assembly of claim 23, wherein at least one of the base member and the glazing member comprises vinyl having embedded additives that reduce thermal conductivity thereof.

34. The window assembly of claim 23, wherein the portion of the vacuum insulated glass unit is inserted into the first slot to a bite depth of greater than or equal to 1.25 inches.

35. The window assembly of claim 23, wherein the glazing member and the base member cooperate to bear a load of the vacuum insulated glass unit.

36. A window assembly comprising:
a plurality of vacuum insulated glass units each including first and second glass substrates defining a space therebetween that is at a pressure lower than atmospheric pressure; and
a frame assembly supporting the vacuum insulated glass units and including a base member and a glazing member, the base member and the glazing member cooperating to define a first slot in which a portion of a first one of the vacuum insulated glass units is received, the base member defining a second slot receiving a portion of a second one of the vacuum insulated glass units, wherein one of the base member or the glazing member includes a recess adjacent the first slot that receives a portion of the first one of the vacuum insulated glass units when the first one of the vacuum insulated glass units is in a distorted condition, wherein one of the first and second glass substrates includes a vacuum port defining a passage extending through the one of the first and second glass substrates and in communication with the space, and wherein the vacuum port is disposed on the portion of first one of the vacuum insulated glass units that is received in the first slot.

37. The window assembly of claim 36, wherein the vacuum port extends outward from the one of the first and second glass substrates, and wherein one of the base member or the glazing member include a cavity receiving the vacuum port of the first one of the vacuum insulated glass units.

38. The window assembly of claim 36, wherein the glazing member includes a tab that snaps into engagement with the base member.

39. The window assembly of claim 36, wherein the base member includes embedded reinforcement members.

40. The window assembly of claim 36, wherein the glazing member and the base member defining a plurality of pockets that reduce thermal conductivity through the frame assembly.

41. The window assembly of claim 40, wherein at least one of the pockets is filled with air.

42. The window assembly of claim 40, wherein at least one of the pockets is filled with foam.

43. The window assembly of claim 36, wherein the recess includes an insulative barrier received therein to absorb energy associated with distortion of the first one of the vacuum insulated glass units.

44. The window assembly of claim 36, wherein the glazing member structurally supports the first one of the vacuum insulated glass units.

45. The window assembly of claim 37, wherein the cavity that receives the vacuum port of the first one of the vacuum insulated glass units is filled with an insulative material.

46. The window assembly of claim 36, wherein at least one of the base member and the glazing member comprises vinyl having embedded additives that reduce thermal conductivity thereof.

47. The window assembly of claim 36, wherein the portion of the first one of the vacuum insulated glass units is inserted into the first slot to a bite depth of greater than or equal to 1.25 inches.

48. The window assembly of claim 36, wherein the glazing member and the base member cooperate to bear a load of the first one of the vacuum insulated glass units.

* * * * *